US006863479B2

(12) United States Patent
Frauhammer et al.

(10) Patent No.: US 6,863,479 B2
(45) Date of Patent: Mar. 8, 2005

(54) SUPPLEMENTAL HANDLE

(75) Inventors: Karl Frauhammer, Leinfelden-Echterdingen (DE); Gerhard Meixner, Filderstadt (DE); Andreas Strasser, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 10/170,107

(22) Filed: Jun. 12, 2002

(65) Prior Publication Data

US 2002/0197939 A1 Dec. 26, 2002

(30) Foreign Application Priority Data

Jun. 25, 2001 (DE) ........................................ 101 30 548

(51) Int. Cl.[7] ................................................ B23B 45/00

(52) U.S. Cl. ....................... 408/241 R; 16/426; 16/430; 16/900; 173/162.2

(58) Field of Search ........................ 408/241 R; 16/900, 16/426, 430; 173/171, 162.1, 162.2

(56) References Cited

U.S. PATENT DOCUMENTS 5,157,807 A * 10/1992 Keller et al. ............. 173/162.2
5,273,120 A * 12/1993 Chang ..................... 173/162.2
5,365,637 A * 11/1994 Bodell et al. ............ 173/162.2
5,749,421 A 5/1998 Johansson et al.
5,769,174 A * 6/1998 Lee et al. ................ 173/162.2
5,921,695 A * 7/1999 Warner et al. ................ 403/84
6,148,930 A * 11/2000 Berger et al. ............ 173/162.2

FOREIGN PATENT DOCUMENTS

DE 28 04 223 C2 9/1983
DE 41 04 917 A1 8/1992
GB 2080920 A * 2/1982 .............. 173/162.2
GB 2138348 A * 10/1984 .............. 173/162.2
GB 2 297 514 A 8/1996
WO 95/21039 8/1995

* cited by examiner

*Primary Examiner*—Daniel W. Howell
(74) *Attorney, Agent, or Firm*—Michael J. Striker

(57) ABSTRACT

A supplemental handle for a hand-held machining tool (18), has at least one grip element (10, 12, 14, 16) that is connectable with a housing (26) of the hand-held machine (18) by means of an insulating device (20, 22, 24) for insulating oscillations. The insulating device (20, 22, 24) includes at least one bearing unit (28, 30, 32, 34), and the grip element (10, 12, 14, 16) is guided in at least one direction by means of the bearing unit (28, 30, 32, 34). The bearing unit (28) has at least one bearing bolt (26), about which the grip element (10, 12) is pivotable. The insulating device may include at least one torsion spring.

12 Claims, 4 Drawing Sheets

SUPPLEMENTAL HANDLE

BACKGROUND OF THE INVENTION

The present invention relates to a supplemental handle for a hand-held machining tool.

DE 28 04 223 C1 discloses a supplemental handle of this type with a grip element that is connectable to a housing of a hand-held machining tool, which has a particular tendency for axial oscillation, by means of an insulation device. In a grip element formed from a casing, a threaded bolt is mounted, which is screwable into a recess of the housing of the hand-held machining tool with its free end that projects from the grip element. A rubber-elastic, insulating layer is provided between the threaded bolt and the grip element.

SUMMARY OF THE INVENTION

The present invention is based on a supplemental handle for a hand-held machining tool with at least one grip element, or handle, which is connectable to a housing of the hand-held machining tool by means of an insulating device for vibration or oscillation insulation.

It is proposed that the insulation device has at least one bearing unit, by which the grip element is guided in at least one direction. With the insulating device of the present invention, an advantageous insulation of vibration and oscillation of the grip element in the oscillation direction is provided, thus leading to a stabile, controlled guiding of the hand-held machining tool by means of the grip element.

When the bearing unit has at least one bearing bolt, about which the grip element is pivotable, a compact bearing unit of simple construction can be obtained, in which, preferably, a clamping slope of the grip element can be avoided. It is contemplated that the most ergonomically effective form of the handle has a pivoting angle of up to 25°.

In addition, the insulating device for insulating oscillation of the grip element preferably has at least one torsion spring. The torsion spring can be used as a bearing bolt tensioned by the pivoting movement of the grip element. With minimal components, a constructively simple and space-saving insulating device for the insulating of oscillation and vibrations is achievable. It is also contemplated that instead of torsion springs, the practitioner would also recognized various other types of spring elements or spring units as workable with the present invention, for example, spring units with one or more compression springs, air compression springs, rubber casings, and the like.

It is particularly advantageous if the grip element is supported so as to be rotatable about its longitudinal axis. A compensating movement in the wrist of the user can be avoided, and thus, comfortable and wrist-protecting work is made possible.

In a further form of the present invention, the grip element is translatory guided via the bearing unit in at least one direction against a spring element. Preferably, a distance between a machining axis, in particular a drill hammer and/or chipping hammer, and the grip element, as well as the orientation of the grip element to the machining axis, is kept constant. The hand-held machining tool is exactly guidable, and a movement in the wrist of the user during a machining process can be avoided, particularly through a linear guide of the grip element, and the comfort for the user can be increased.

The translatory guide, in particular the linear guide, of the grip element on the hand-held machining tool can be achieved with a simple construction, in which the bearing unit for guiding the grip element has at least one sliding carriage or rail that is guided into a guide rail. In order to avoid angle of the sliding carriage in the guide rail, the sliding carriage is fitted with a corresponding large guide surface.

If the guide rail is sealed from the outside by at least one sealing element, an advantageous protection of the bearing unit, and in particular of a spring element of the insulating device, from contamination by fine machining dust during a drilling operation, can be obtained. If the spring element breaks during a machining process, an advantageous protection of the user by means of the sealing element is obtained, and pieces that are loose or falling off can be caught.

Preferably, the carriage is limited in the guide rail in the machining direction through an end stop. By means of the end stop, a safe guiding of the hand-held machining tool is permitted if a break in the spring element occurs during the machining process. If the end stop is made from an insulating and/or damping material, an insulating and/or damping effect of the insulating device can be maintained upon contact of the grip element at the end stop, for example, in particular machining positions, in which a spring force of the spring element surpasses a pressing force, or upon breaking of the spring element, and so on. Thus, the hand-held machining tool is still comfortably guidable.

When the grip element is guided by means of the bearing unit in the machining direction, an advantageous insulating of oscillations and guiding can be obtained with hand-held machining tools in which oscillation in a first line in the machining direction occur, for example, with hand saws, scrapers, and in particularly, with drilling and/or chipping hammers.

Preferably, a bearing unit of the insulating device is arranged in front of and behind the grip element in its longitudinal direction. Rotational moment on the bearing units and clamping angles associated with such moment can be avoided. It is also contemplated that the practitioner skilled in the art would recognize various constructions in order to avoid rotational moment in the bearing unit of the insulating device, for example, with a bearing unit lying in the load axis of the grip element, and so forth.

In addition, the insulating device preferably has a compression spring. Compression spring can be manufactured cost effectively with minimal tolerances. If a main handle of the hand-held machining toll has an insulating device with compression springs, simple compressions springs with the same insulating and/or damping characteristics as the main handle can be used.

When the insulating device has counteracting spring elements, for example, counteracting, tensioned torsion springs, compression springs, air compression springs, rubber casings, and so forth, an advantageous oscillation insulating can be achieved in two opposite directions. Upon a small pressing force supplied by the user via the grip element, a comfortable oscillation insulating of the grip element in two directions is obtainable. In addition, the spring elements can be constructed in each direction with different characteristics, in particular, with different insulating qualities, and be adapted to different limitations. In this regard, a build-up of oscillations upon reaching a resonance frequency of one of the two spring elements is avoidable.

If, in addition to at least one first spring element, a second spring element of the insulating device comes into an operative connection when at least one selected characteristic magnitude of an operating parameter, a resulting spring characteristic curve can be designed in a particularly flexible manner and with inexpensive standard spring elements for various types of uses. This can be achieved simply, in which at a selected, applied pressure in the direction of movement of the grip element, or at a determined spring travel course of the first spring element, the second spring element comes into contact in addition to the first spring element. It is also possible, however, that depending on a position of the hand-held machining tool, more or fewer spring elements come into a working connection. This can be realized, for example with a key action using gravitational force, in which the hand-held machining tool, in a level position, either clicks a spring element and/or a contact surface in a first corresponding position, so that the spring element is lined to the grip element by means of a force, and in which the hand-held machining tool, in a perpendicular position, clicks the spring element and/or the contact surface downwardly in a second corresponding position, so that a linking of the spring element through a force on the grip element is avoided. In addition to the described mechanics, additional mechanisms that a practitioner would recognize as logical and useful in the present invention are contemplated.

DETAILED DESCRIPTION OF THE PREFERRED EMBODIMENTS

Figure 1:
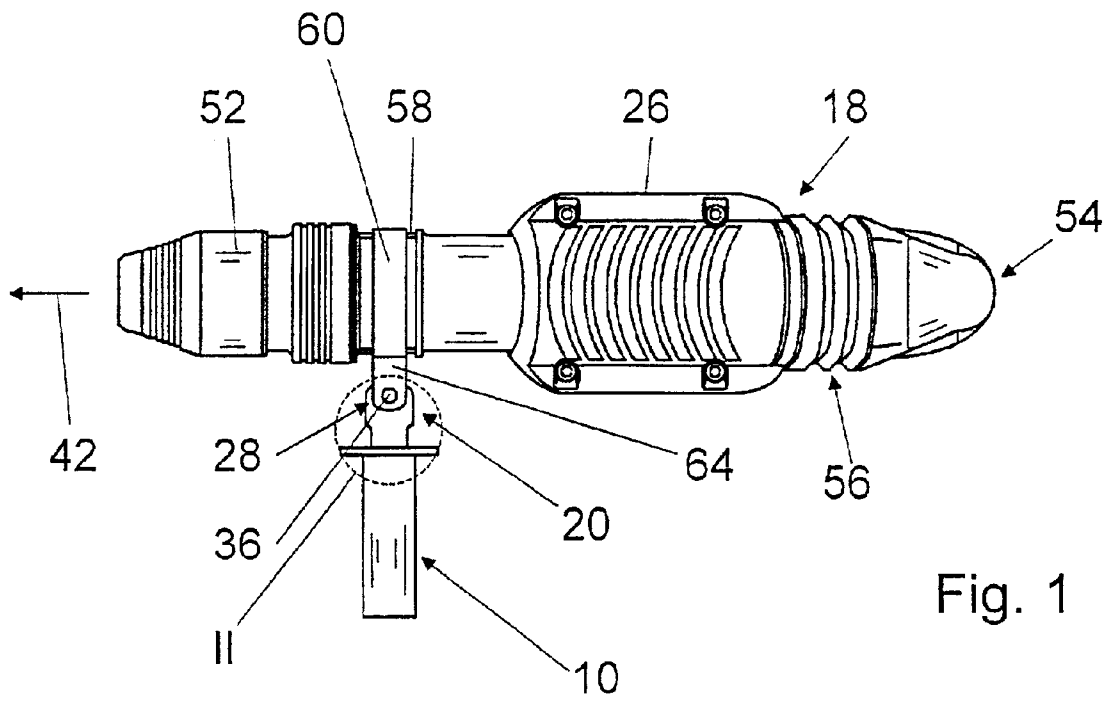
FIG. 1 shows a drilling and chipping hammer with a pivotably supported supplemental handle, according to the present invention.

FIG. 1 shows a drilling and chipping hammer 18 with an electric motor (not clearly shown) arranged in a housing 26. A tool (not specifically shown), insertable into a tool holder 52, is rotatably driven by a drive, and via a striking mechanism is impacted, by operation of the electric motor. On one side of the housing 25 facing away from the tool holder 52, a main handle 54 is disposed, which is connected with the housing 25 via an insulating device 56.

In a front area of the housing 26, after the tool holder 52 relative to the machining direction 42, a shoulder 58 is formed, on which a supplemental handle with a grip element 10 is secured by means of a clamping ring or collar 60.

Figure 2:
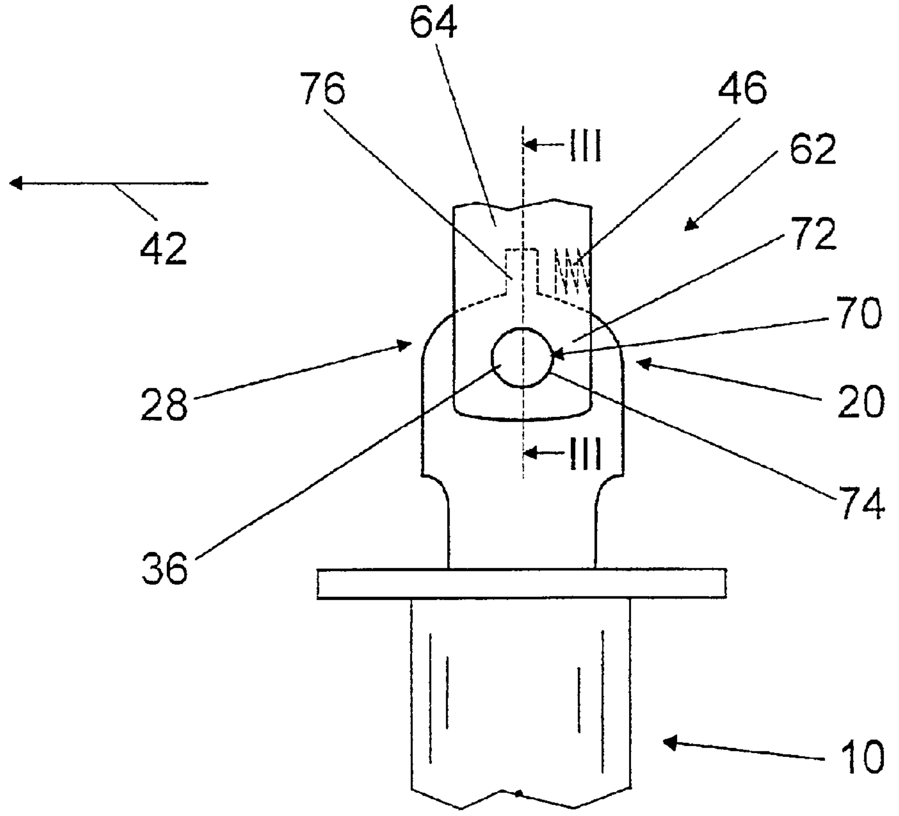
FIG. 2 shows an enlarged view of the cutaway II of FIG. 1 with an insulating device of the supplemental handle.

The supplemental handle, formed as a post or shaft handle, is connected with the housing 26 of the drill and chipping hammer 18 by an insulating device 20 (FIGS. 1 and 2).

Figure 3:
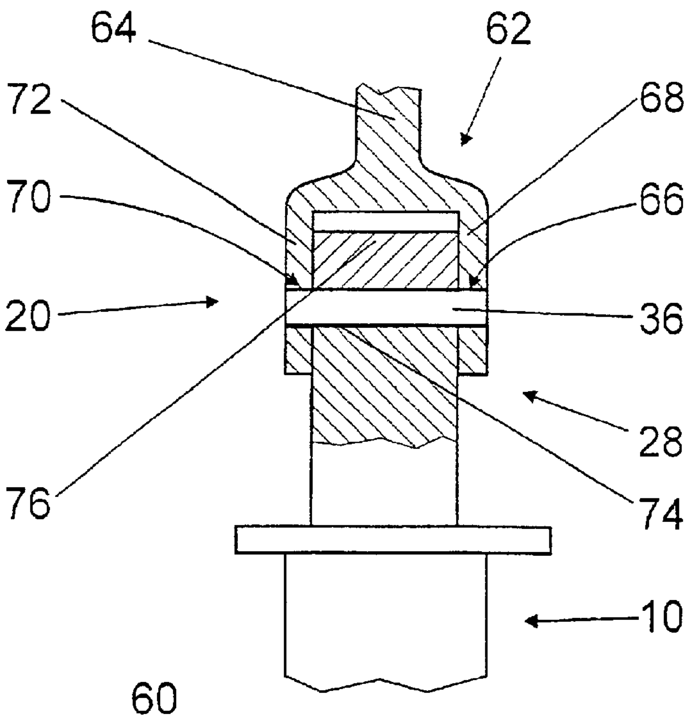
FIG. 3 shows a section along lines III—III in FIG. 2.

The insulating device 20 has a bearing unit 28 with a torsion spring, formed as a bearing bolt 36, around which the grip element 10 is pivotably supported and is guided in the machining direction 42. The bearing unit 28 is disposed between the grip element 10 and the housing 26. The bearing bolt 36 is mounted such that its first end 66 is non-rotatably supported in a first leg 68 of a U-shaped receiving area 62 of a stepped extension of the collar 60 that extends radial to the housing 26. The second end 70 of the bearing bolt 36 is rotatably supported in a second leg 72 of the receiving area 62 (FIG. 3). The bearing bolt 36 is guided by means of a bearing bore 74 of the grip element 10, and on the side of the bearing bolt facing toward the second end 70, the bearing bolt is non-rotatably connected with the bearing bolt 36 via a stage.

Upon chipping and/or drilling, the user guides the drill or chipping hammer 18 at the main handle 54 and at the oscillation-insulated grip element 10 of the supplemental handle in the machining direction 42 against a surface to be machined, whereby the supplemental handle for oscillation insulating can be linked pivotably against a spring force of the torsion spring, formed as a bearing bolt 36.

The insulating device 20 further comprises a compression spring 46, which is secured with its end that faces away from the machining direction 42 into the receiving area 62 of the collar 60. At a selected magnitude, or a selected applied force of the user on the supplemental handle in the machining direction 4, the compression spring 46, with its end in the machining direction 42, comes into contact with a catch 76 formed on the grip element 10. The spring forces of the torsion spring and the compression spring 46 are added together, and achieve an increased spring rigidity (FIG. 2).

In FIGS. 4 through 9, further embodiments of the invention are illustrated. Like components are represented with the same reference numerals as used to describe the previous embodiments. In addition, similar features and functions are to be referenced in the description of the embodiments shown in FIGS. 1 through 3. The following description is limited essentially to differences between the embodiments shown in FIGS. 4 through 9 and the embodiments of FIGS. 1 through 3.

Figure 4:
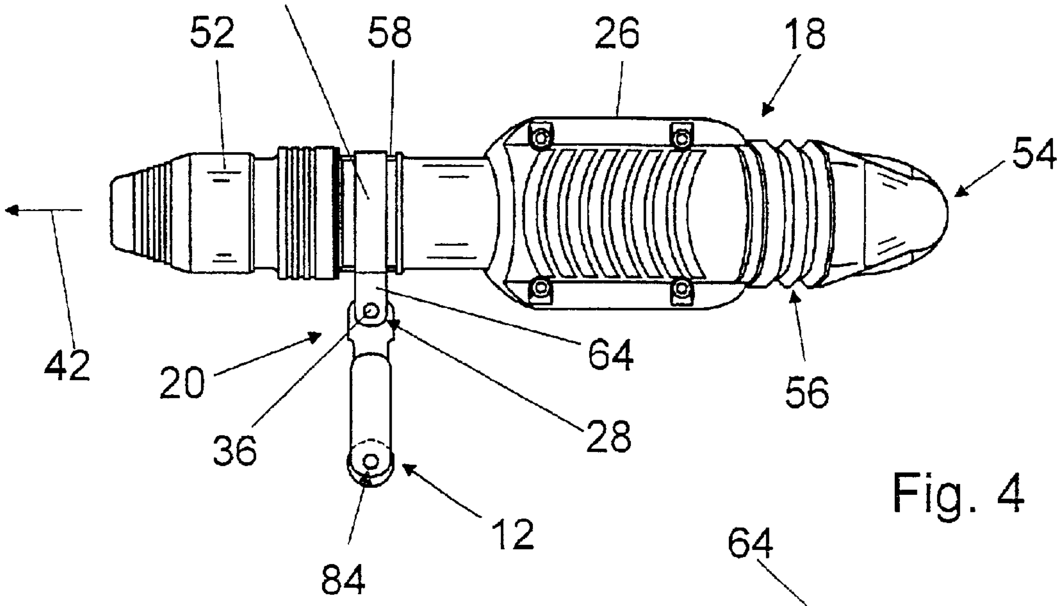
FIG. 4 shows a variant to the embodiment of FIG. 1 with a U-shaped or loop handle.
Figure 5:
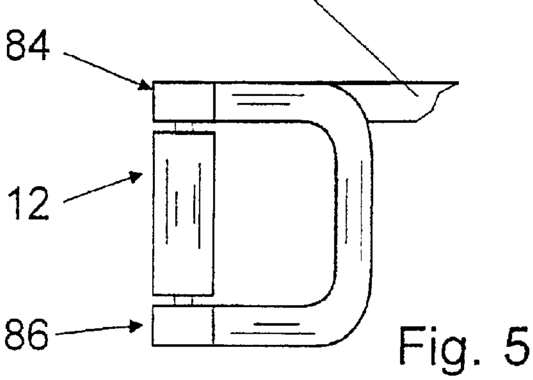
FIG. 5 shows the U-shaped handle of FIG. 4 in a side view.

In FIGS. 4 and 5, a supplemental handle formed as a loop or U-shaped handle is shown, in which the U-shaped handle is connected with a housing 25 of a drilling and chipping hammer 18 via the insulating device 20 of the embodiment of FIGS. 1 through 3. The loop handle is rotatably supported about its longitudinal axis in front of and behind its grip element 12 in its longitudinal direction, respectively, in a bearing unit 84, 86.

Figure 6:
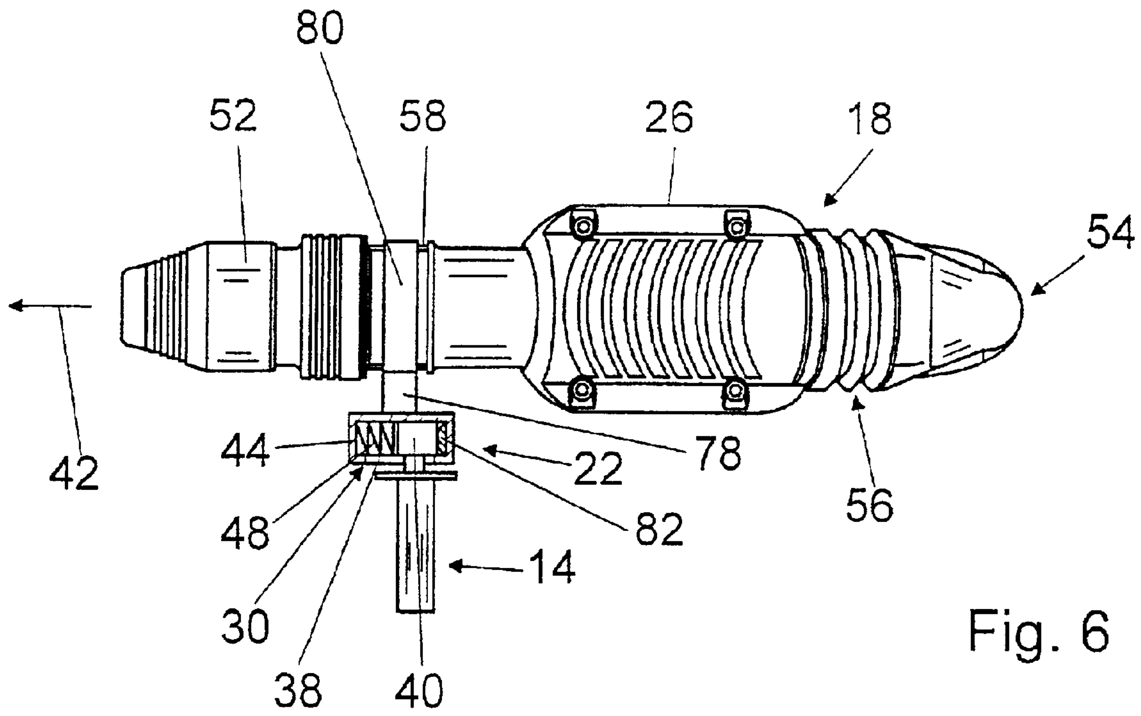
FIG. 6 shows a drilling and chipping hammer with a partial sectional view taken through an insulating device of a translatory guided supplemental handle.

In FIG. 6, a supplemental handle formed as a pole or staff handle of a drilling or chipping hammer 18 with an insulating device 22 is illustrated. The supplemental handle is connected with a housing 26 of the drilling and chipping chamber 18 by means of the insulating device 22 and via a stepped projection 78 of a collar 80, whereby the projection 78 extends radially to the housing 26.

The insulating device 22 has a bearing unit 30, by means of which a grip element 14 of the supplemental handle is translatory guided in the machining direction 42.

The bearing element 30 sealed with a sealing element (not specifically shown) has a guide rail 38 and a carriage 40 guided in the guide rail 38, with the grip element 14 secured to the carriage 40.

The grip element 14 is guidable via the carriage 40 in the bearing unit 30 in the machining direction 42 against a compression spring 48 (FIG. 6). The compression spring 48 is braced with its front end (that is, the end nearest the machining direction 42) on a wall of the guide rail 38 and operates with its back end (that is, the end opposite the machining direction) on the carriage 40. The wall of the guide rail 38 toward the machining direction 42 serves as an end stop 44 for the carriage 40 guided in the guide rail 38. Opposite to the machining direction 42, the guide rail 38 has a stop 82, made of an elastic rubber, which is secured to a wall of the guide rail 38 and operates to insulating oscillations. The compression spring 48, tension in a resting state, presses the carriage 40 with a side that faces away from the machining direction counter to the machining direction 42 against the stop 82 (FIG. 6).

When the user guides the drilling and chipping hammer 18 at a main handle 54 and at the grip element 14 of the supplemental handle against a surface to be machined, the grip element 14 is guided by means of a pressing force of the user via the carriage 40 in the machining direction 42 against a spring force of the compression spring 48. With the translatory movement of the grip element 14 with a constant distinct to a machining axis of the drilling and chipping hammer 18, the grip element 14 is uncoupled in an axial direction from the housing 26, and the insulating device 22 operates to insulate oscillations between the housing 26 and the grip element 14 (FIG. 6).

Figure 7:
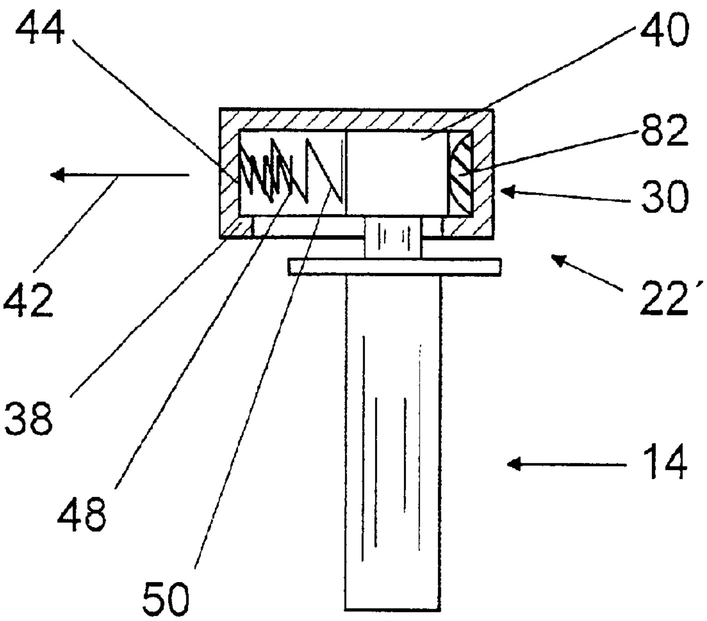
FIG. 7 shows a partial view taken through another embodiment of an insulating device with a multi-stage spring unit.
Figure 8:
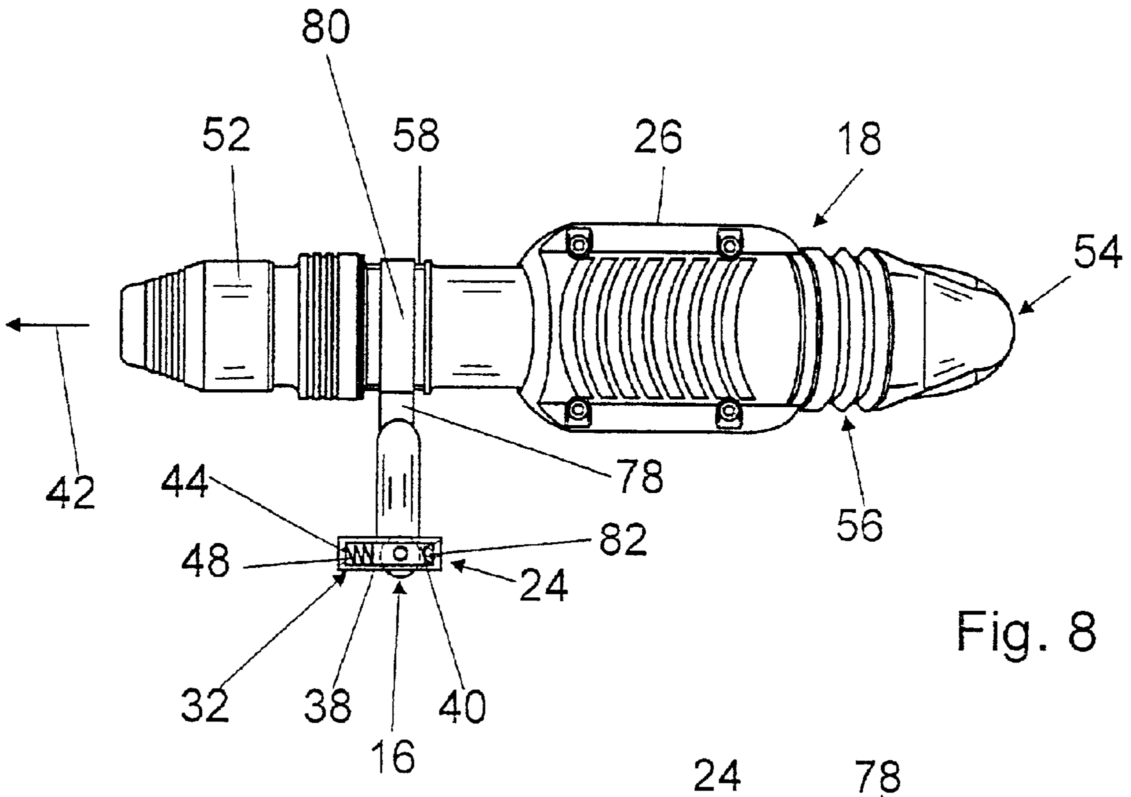
FIG. 8 shows a variant to the embodiment of FIG. 5 with a loop or U-shaped handle.
Figure 9:
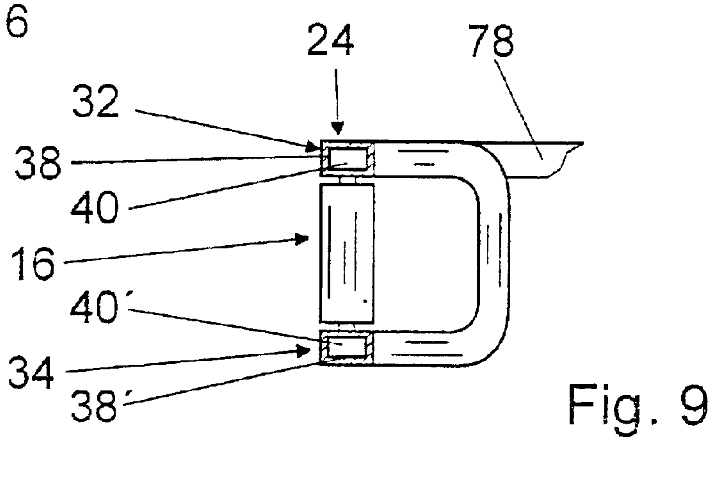
FIG. 9 shows the loop handle of FIG. 8 in a side view with a partial sectional view taken through its insulating device.

FIG. 7 shows an alternative supplemental handle to that of FIG. 6 with an insulating device 20', in which near a first compressions spring 48, a second compression spring 50 is disposed in a guide rail 38. The second compression spring 50 is secured to a wall of the guide rail 38 with its end that is toward the machining direction. The other end of the compression spring 50, that is the end away from the machining direction 42, comes into contact with the carriage 50 guided in the guide rail 38 at a selected characteristic magnitude, or at a selected applied force of the use on the supplemental handle in the machining direction 42.

If the drilling and chipping hammer 18 is operated in level or horizontal working position, the weight force of the drilling and chipping hammer 18 acts perpendicular to the machining direction 42, and a greater operating force in the machining direction 42 be must applied by the user onto the grip element 14 then with a downward perpendicular working position. By means of the larger applied operating force, the first compression spring 48 is compressed to the point that the carriage 40 comes into contact with the second compression spring 50. The spring force of the first and the second compression springs 48, 50 total to a spring force that is advantageous for a horizontal or level working position. The spring operation, or the insulating operation, is maintained also with a strong counter pressure. In downwardly perpendicular working positions, in horizontal working positions, and in upwardly perpendicular working positions an advantageous insulating area is consistently provided for the corresponding working position.

It will be understood that each of the elements described above, or two or more together, may also find a useful application in other types of constructions differing from the types described above.

While the invention has been illustrated and described herein as a supplemental handle for a hand-held machining tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A supplemental handle for a hand-held machining tool (18) having a main handle, comprising at least one grip element (10, 12, 14, 16), wherein said at least one grip element (10, 12, 14, 16) is connectable with a housing (28) of the hand-held machine (18) by means of an insulating device (20, 22, 24) for insulating oscillations, wherein the insulating device (20, 22, 24) has at least one bearing unit (28, 30, 32, 34), wherein the at least one grip element (10, 12, 14, 16) is guided in at least one direction relative to the housing by means of said at least one bearing unit (28, 30, 32, 34), wherein the at least one grip element (14, 16) is guided in a translatory manner by means of the bearing unit (30, 32, 34) in at least one direction.

2. The supplemental handle as defined in claim 1, wherein the bearing unit (28) has at least one bearing bolt (26), and wherein the at least one grip element (10, 12) is pivotable about said bearing bolt (36).

3. A supplemental handle for a hand-held machining tool (18), comprising at least one grip element (10, 12, 14, 16), wherein said at least one grip element (10, 12, 14, 16) is connectable with a housing (26) of the hand-held machine (18) by means of an insulating device (20, 22, 24) for insulating oscillations, wherein the insulating device (20, 22, 24) has at least one bearing unit (28, 30, 32, 34), wherein the at least one grip element (10, 12, 14, 16) is guided in at least one direction by means of said at least one bearing unit (28, 30, 32, 34), and wherein the insulating device (20) for insulating oscillations of the at least one grip element (10, 12) has at least one torsion spring.

4. A supplemental handle for a hand-held machining tool (18), comprising at least one grip element (10, 12, 14, 16), wherein said at least one grip element (10, 12, 14, 18) is connectable with a housing (26) of the hand-held machine (18) by means of an insulating device (20, 22, 24) for insulating oscillations, wherein the insulating device (20, 22, 24) has at least one bearing unit (28, 30, 32, 34), wherein the at least one grip element (10, 12, 14, 16) is guided in at least one direction by means of said at least one bearing unit (28, 30, 32, 34), and wherein the at least one grip element (12) is rotatably supported about a longitudinal axis of said at least one grip element (12).

5. A supplemental handle for a hand-held machining tool (18), comprising at least one grip element (10, 12, 14, 16), wherein said at least one grip element (10, 12, 14, 16) is connectable with a housing (26) of the hand-held machine (18) by means of an insulating device (20, 22, 24) for insulating oscillations, wherein the insulating device (20, 22, 24) has at least one bearing unit (28, 30, 32, 34), wherein the at least one grip element (10, 12, 14, 16) is guided in at least one direction by means of said at least one bearing unit (28, 30, 32, 34), wherein the at least one grip element (14, 16) is guided in a translatory manner by means of the bearing unit (30, 32, 34) in at least one direction, and wherein said at teats one bearing unit (32, 34) of the insulating device (24) is disposed in front of and after the at least one grip element (16) in a longitudinal direction of said at least one grip element (16).

6. The supplemental handle as defined in claim 1, wherein the bearing unit (30, 32, 34) for guiding the at least one grip element (14, 16) has at least one carriage, wherein said at least one carriage (40) is guided in a guide rail (38).

7. The supplemental handle as defined in claim 6, wherein movement of the at least one carnage (40) in the guide rail (38) in a machining direction (42) is limited by an end stop (44).

8. The supplemental handle as defined in claim 6, wherein the guide rail (38) is sealed outwardly by means of at least one sealing element.

9. The supplemental handle as defined in claim 1, wherein the at least one grip element (14, 16) is guided in a machining direction (42) by means of said at least one bearing unit (31, 32, 34).

10. A supplemental handle for a hand-held machining tool (18) having a main handle, comprising at least one grip element (10, 12, 14, 16), wherein said at least one grip element (10, 12, 14, 16) is connectable with a housing (26) of the hand-held machine (18) by means of an insulating device (20, 22, 24) for insulating oscillations, wherein the insulating device (20, 22, 24) has at least one beating unit (28, 30, 32, 34), wherein the at least one grip element 10, 12, 14, 16) is guided in at least one direction relative to the housing by means of said at least one bearing unit (28, 30, 32, 34), wherein from at least one selected characteristic magnitude of an operating parameter spring force of at least one second spring element (48, 50) of the insulating device comes into effect, along with at least one first spring element.

11. A supplemental handle for a hand-held machining tool (18) having a main handle comprising at least one grip element (10, 12, 14), wherein said at least one grip element (10, 12, 14, 16) is connectable with a housing (26) of the hand-held machine (18) by means of an insulating device (20, 22, 24) for insulating oscillations, wherein the insulating device (20, 22, 24) has at least one bearing unit (28, 30, 32, 34), wherein the at least one grip element (10, 12, 14, 16) is guided in at least one direction relative to housing by means of said at least one bearing unit (28, 30, 34), wherein the insulating device (20, 22, 24) has at least one compression spring (46, 48, 50).

12. A hand-held machining tool with the supplemental handle as defined in claim 1.

* * * * *